(12) United States Patent
Peters et al.

(10) Patent No.: US 9,095,921 B2
(45) Date of Patent: Aug. 4, 2015

(54) REAL TIME INDUCTANCE MONITORING IN WELDING AND CUTTING POWER SUPPLY

(75) Inventors: Steven R Peters, Huntsburg, OH (US); Thomas William Matthews, Chesterland, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 709 days.

(21) Appl. No.: 13/273,859

(22) Filed: Oct. 14, 2011

(65) Prior Publication Data

US 2013/0092672 A1   Apr. 18, 2013

(51) Int. Cl.
| B23K 9/09 | (2006.01) |
| B23K 9/10 | (2006.01) |
| B23K 9/095 | (2006.01) |
| B23K 9/32 | (2006.01) |

(52) U.S. Cl.
CPC ............ *B23K 9/1056* (2013.01); *B23K 9/0953* (2013.01); *B23K 9/1006* (2013.01); *B23K 9/1062* (2013.01); *B23K 9/32* (2013.01)

(58) Field of Classification Search
CPC .. B23K 9/0953; B23K 9/1006; B23K 9/1056; B23K 9/1062; B23K 9/32
USPC .................... 219/130.01–130.51, 136–137 PS
See application file for complete search history.

(56) References Cited

U.S. PATENT DOCUMENTS

| 4,546,234 A | * | 10/1985 | Ogasawara et al. ...... 219/137 PS |
| 4,721,947 A | * | 1/1988 | Brown .......................... 340/540 |
| 4,954,691 A | * | 9/1990 | Parks et al. ............. 219/137 PS |
| 5,043,557 A | * | 8/1991 | Tabata et al. ............. 219/130.51 |
| 5,571,431 A | | 11/1996 | Lantieri et al. |
| 6,710,297 B1 | | 3/2004 | Artelsmair et al. |

FOREIGN PATENT DOCUMENTS

| EP | 1027951 A1 | 8/2000 |
| JP | 2001276971 A | 11/1996 |
| WO | 2007132362 A2 | 11/2007 |
| WO | 2008140398 A1 | 11/2008 |
| WO | 2010141435 A2 | 12/2010 |

OTHER PUBLICATIONS

International Search Report dated Feb. 2, 2013.

* cited by examiner

*Primary Examiner* — Sang Y Paik
(74) *Attorney, Agent, or Firm* — Perkins Coie LLP

(57) ABSTRACT

A system and method is provided for monitoring and displaying real time information regarding the inductance of the welding circuit, such that a user can monitor the performance of a power supply to determine if the system inductance is adversely affecting the operation of the power supply.

28 Claims, 4 Drawing Sheets

REAL TIME INDUCTANCE MONITORING IN WELDING AND CUTTING POWER SUPPLY

BACKGROUND OF THE INVENTION

1. Field of the Invention

Methods and systems consistent with the present invention relate to welding and cutting power supplies, and more specifically relate to welding and cutting supplies which can monitor their inductance.

2. Description of the Related Art

As the technology in welding and cutting power supplies has advance the power supplies have been able to perform more complex welding, which often requires complex welding waveforms, including high current and voltage ramp rates. However, because of the nature of power supplies and the welding operation a significant amount of inductance can be present in the welding circuit, which can come from the power supply itself, the workpiece and the welding cables. Power supplies have been developed which are capable of controlling or dealing with the inductance inherent in the power supply. However, because the power supply is not always positioned close to a welding operation, the inductance created because of long welding cables and from the workpiece is more difficult to deal with. When the welding cables become too long, this inductance can compromise the operation of the power supply, or limit its performance.

BRIEF SUMMARY OF THE INVENTION

Embodiments of the invention include a welding or cutting power supply having a first and second output terminal, a power component module coupled to each of the first and second output terminals which outputs an output signal through the first and second terminals. A positive lead is coupled to the first terminal and a second lead is coupled to the second terminal. There is also a voltage detection circuit which detects an output voltage across the first and second output terminals during a welding or cutting operation, and a comparator circuit which compares the detected voltage to a threshold voltage. A user display is included which displays a result of the comparison between the detected voltage and the threshold voltage for a user of the power supply.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
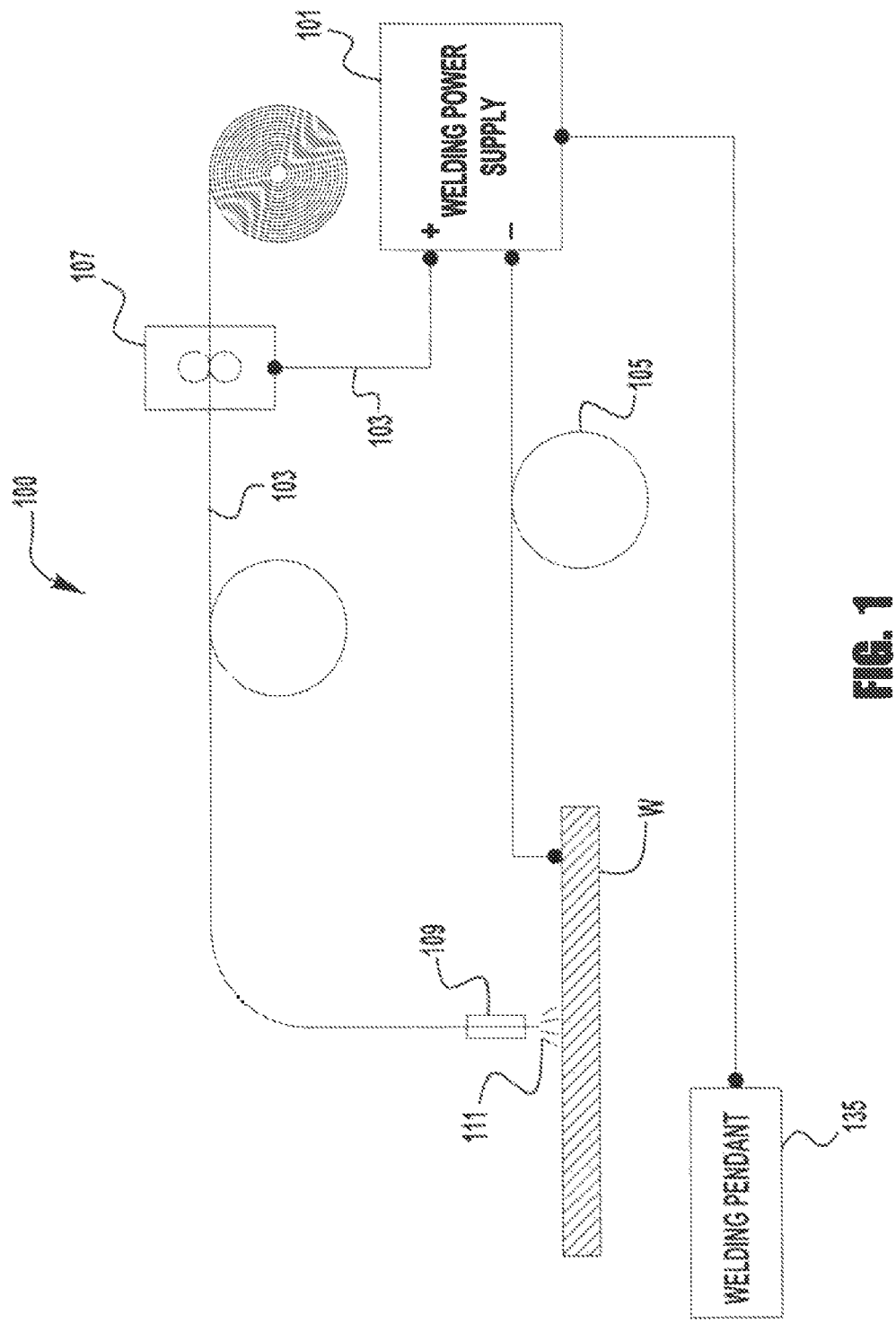
FIG. 1 is a diagrammatical representation of a welding system in accordance with an exemplary embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 depicts an exemplary embodiment of a welding system 100 of the present invention. The system 100 shown in this figure is a welding system. However, embodiments of the present invention are not limited to a welding system and can also be a cutting system (such as a plasma cutting system) as well. Throughout this specification the term "welding system" may be used, but its use is intended to simply the discussion and it should be understood that embodiments of the present invention can also be used in cutting systems, which have a similar structure and operation to that of a welding system.

The welding system 100, which can be an arc welding system, contains a power supply 101 which provides a welding signal through the welding leads 103 and 105 to a work piece W. The welding signal has a current and a voltage, and can be any type of welding signal that requires a change in current from one level to another. For example, the signal can be a pulse welding signal which changes from a background to a peak level during welding, or an alternating polarity waveform that changes from one polarity to the other at a known rate. The current from the power supply 101 is delivered to an electrode 111 via a contact tip 109 to generate an arc between the electrode 111 and the work piece. As is common in welding systems the positive lead 103 is coupled to a wire feeding device 107 which then passes the welding current through a welding cable to the contact tip 109. In such a configuration the overall length of the positive lead 103 is a combination of the connection from the power supply 101 to the wire feeder 107 and from the wire feeder 107 to the contact tip 101. Of course the lead 103 can be coupled directly to the contact tip 109. Further, although the present discussion and figures are generally related to, and depict, a gas metal arc welding (GMAW) process, this depiction and discussion is intended to be only exemplary. Embodiments of the present invention can be implemented in welding systems which perform various types of welding operations, including but not limited to: FCAW, SAW, TIG, etc., and can be used in plasma cutting systems.

In FIG. 1, the welding leads 103 and 105 are depicted to be quite long as the work piece W can be positioned far away from the power supply. For example, in some industrial applications the leads 103/105 can have a length off at least 100 feet. Such long lengths can significantly increase the inductance of a welding circuit.

The power supply 101, like all welding (and cutting) power supplies, has an upper current and voltage output limit based on its inherent design. This limitation may be part of the hardware design of the power source or may be part of a protection circuit in the power source's control system. Of course, this limit will vary depending on the type, design and size of the power supply, but each power supply has output limits. When the power demanded by the welding or cutting process is pushed above the limits of the power source 101, the actual welding/cutting output will be limited and the welding/cutting characteristics will suffer.

Many modern welding processes are defined by two or more current levels with defined ramp rates to transition between the current levels. For example, in pulse welding, there is a defined high peak current level and a defined lower background level along with a ramp up rate and ramp down rate that defines how fast the current will change between these levels. For a second example, in a variable polarity system there is a positive current level and a negative current level along with a defined ramp rate to transition between the two polarities.

In many applications, due to a number of reasons, the power source must be located a distance from the actual point of work. Long electrode cables 103/105 are used to transfer current from the power source to the work W and wire feeder 107. When these electrode leads 103/105 become longer they can add inductance to the overall welding circuit. This added inductance can cause a peak in the output voltage as the current is ramping up, and this voltage peak often occurs just before the current levels out at the desired peak current output. This voltage spike can be referred to as reflected voltage as it is essentially a product of the change of current reflected back to the power supply 101 because of the circuit inductance. Thus, the reflected voltage is essentially the voltage seen at the output studs of the machine during welding, which is a result of the welding system inductance. With the added inductance from long welding leads, this reflected voltage can cause the output voltage to reach or exceed the desired or designed voltage output threshold of the power supply 101. This reflected voltage or voltage peak can be further understood when considering that Volt. $=(L \times (di/dt) + I \times R_{(cables+arc)})$, where L is the inductance of the welding cables, di/dt is the current ramp rate (amps/ms), R is the combined resistance of the arc and the welding cables and I is the current. Fast ramp rates (large di/dt) forced into welding circuits with long welding cables (large L) produce high voltage spikes. This is especially noticeable when high peak currents (large I) are required. The additive affect of high inductance and high current amplifies the voltage observed. In the above stated equation, the rate of change of current (di/dt) and the current (I) are both defined by the welding characteristic or mode used. Different weld modes define different ramp rates and different current levels. The inductance (L) and the resistance (R) are part of the welding circuit being used. Depending on the weld mode used, (defining the ramp rate and current levels) the inductance and resistance in the welding circuit may or may not place the output voltage above the design limits of the power source.

A few modern power supplies are capable of running a diagnostic test to determine the inherent inductance and resistance of the welding system. However, these tests are static tests and not designed to monitor the real-time welding circuit inductance during welding (or cutting) to allow a user to monitor how the system inductance is affecting system performance. Depending on the active weld mode being used, the actual ramp rates and current levels required, static tests report little about the actual operating conditions being overcome. Exemplary embodiments of the present invention provide such inductance monitoring and feedback.

Figure 2:
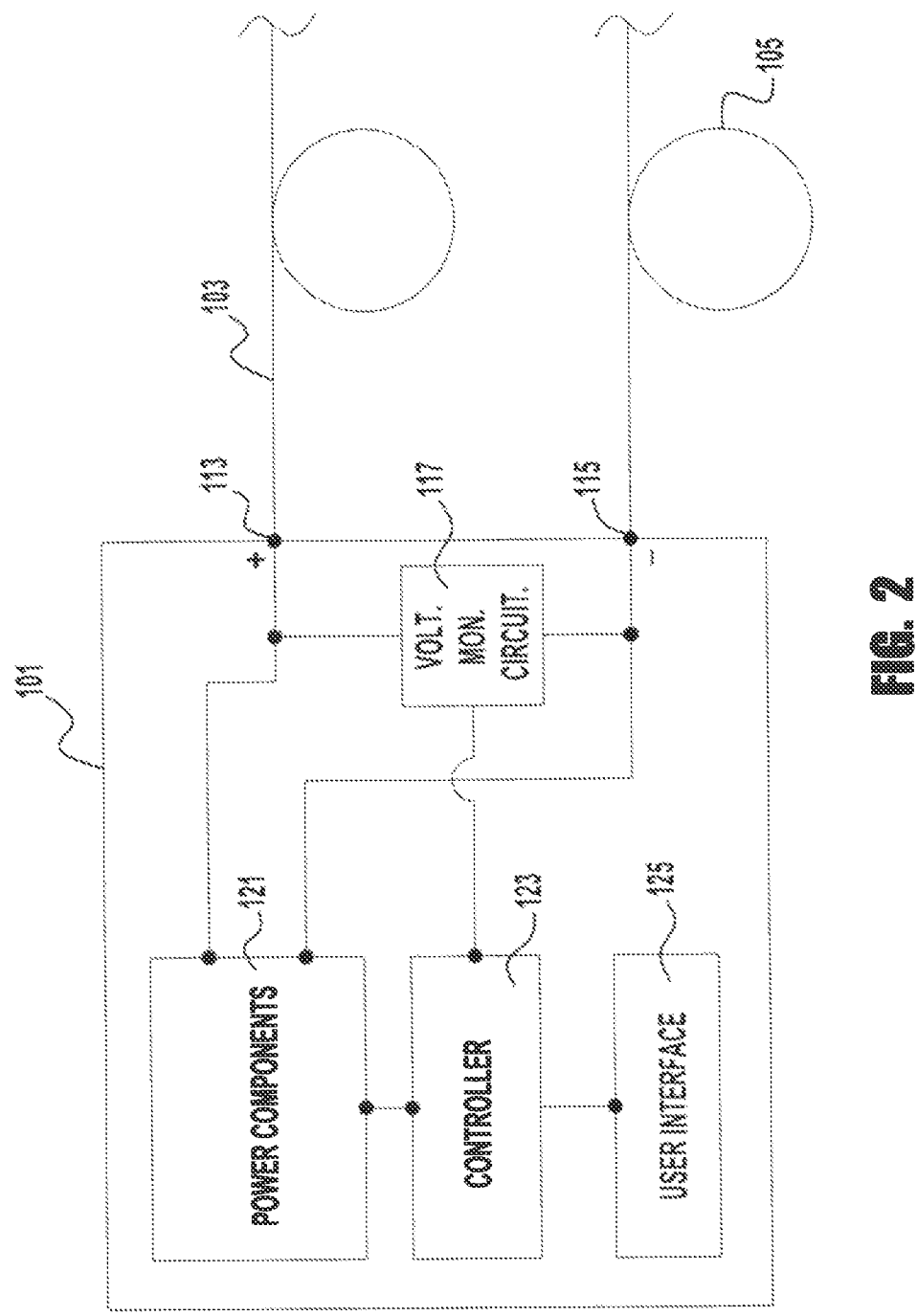
FIG. 2 is a diagrammatical representation of a power supply in accordance with an exemplary embodiment of the present invention.

As shown in FIG. 2, the power supply 101 has a real time voltage monitoring circuit 117, which monitors the output voltage of the power supply 101 across its positive and negative terminals 113/115. In exemplary embodiments of the present invention, this monitoring circuit 117 will not be the same circuit used to otherwise monitor the arc voltage of the welding or cutting process. Alternatively, an existing voltage monitoring circuit in the power supply can be used, however, the circuit must be one that monitors the inductance of the entire welding/cutting circuit. This way the voltage detected will take into account the influence of the welding cables.

In some exemplary embodiments, the voltage monitoring circuit 117 monitors the output voltage at all times, while in other embodiments the circuit 117 only monitors the voltage during the transition of current from a background level to a peak level, for example during the beginning of a welding pulse. In yet other exemplary embodiments, the voltage monitoring circuit 117 only monitors the voltage when the current ramp rate (di/dt) exceeds a threshold value. For example, for a given power supply 101 when the current ramp rate is below a threshold value the inductance of the welding circuit is not as critical and therefore need not be monitored. Whereas, if the ramp rate is above the threshold then monitoring the inductance is more important. In some exemplary embodiments, the ramp rate threshold is predetermined and a function of the construction of the power supply, while in other embodiments the ramp rate threshold is a function of the welding operation being performed and this can vary depending on the welding being performed.

The power supply 101 contains a controller circuit 123 which generally controls the operation of the power supply 101, including the output power components 121, which provide the output power. The output power components 121 can have any known construction, and can be that of a transformer or inverter-type power supply. The present invention is not limited in this regard. The controller 123 can have a memory which contains the predetermined ramp rate threshold for the power supply 101 or can have a look-up table, or similar means, to determine a ramp rate threshold based on user input for a welding operation. In some exemplary embodiments of the present invention, the ramp rate threshold is at or above 400 a/ms. In another exemplary embodiment, the ramp rate threshold is at or above 250 a/ms. Of course, in other embodiments the ramp rate threshold is not employed and the system is constantly monitoring the system inductance so as to provide the needed feedback.

It should also be understood that the ramp rate discussion set forth above is not limited to a positive ramp rate in which the current is increasing from a low positive polarity and is increasing to a higher positive current, but is also intended to included ramp rates where current is proceeding from a one peak current to another peak current, as in AC welding waveforms and variable polarity waveforms, and includes negative slopes. That is, the ramp rate values discussed above are absolute values of the ramp rate.

The controller 123 also contains the voltage output threshold for the power supply 101. This threshold is typically predetermined and is a function of the construction of the power supply 101. Thus, in exemplary embodiments this output voltage threshold will be a preprogrammed value by the manufacturer of the power supply. The threshold voltage can be determined based on many different parameters but is essentially a voltage level that it is desirable not to exceed during operation as it can adversely affect the performance or operation of the power supply. During operation, the controller 123 (or a similar circuit) compares the voltage detected from the circuit 117 and based on that comparison informs a user (through a user interface 125) of the system inductance so that the user can make a determination regarding welding operation. This will be discussed in more detail below. As stated above, this voltage comparison can be performed during the entire welding operation, or can just occur during discrete portions of the welding process, e.g., either when the current ramp rate exceeds a threshold or when the current is increasing from a background to a peak level, or when the polarity changes in a variable polarity system. In some exemplary embodiments, the voltage comparison data is recorded in a memory device in the controller 123 such that a user can review the inductance data at some time after the welding operation. In exemplary embodiments of the present invention, the sampling/detection rate of the voltage is at least 10 KHz. In other exemplary embodiments, the detection/sampling rate is in the range of 100 to 200 KHz.

In other exemplary embodiments the voltage comparison can be done by a comparator circuit outside of the controller 123, where the comparison result is then communicated to the controller 123.

Figure 3:
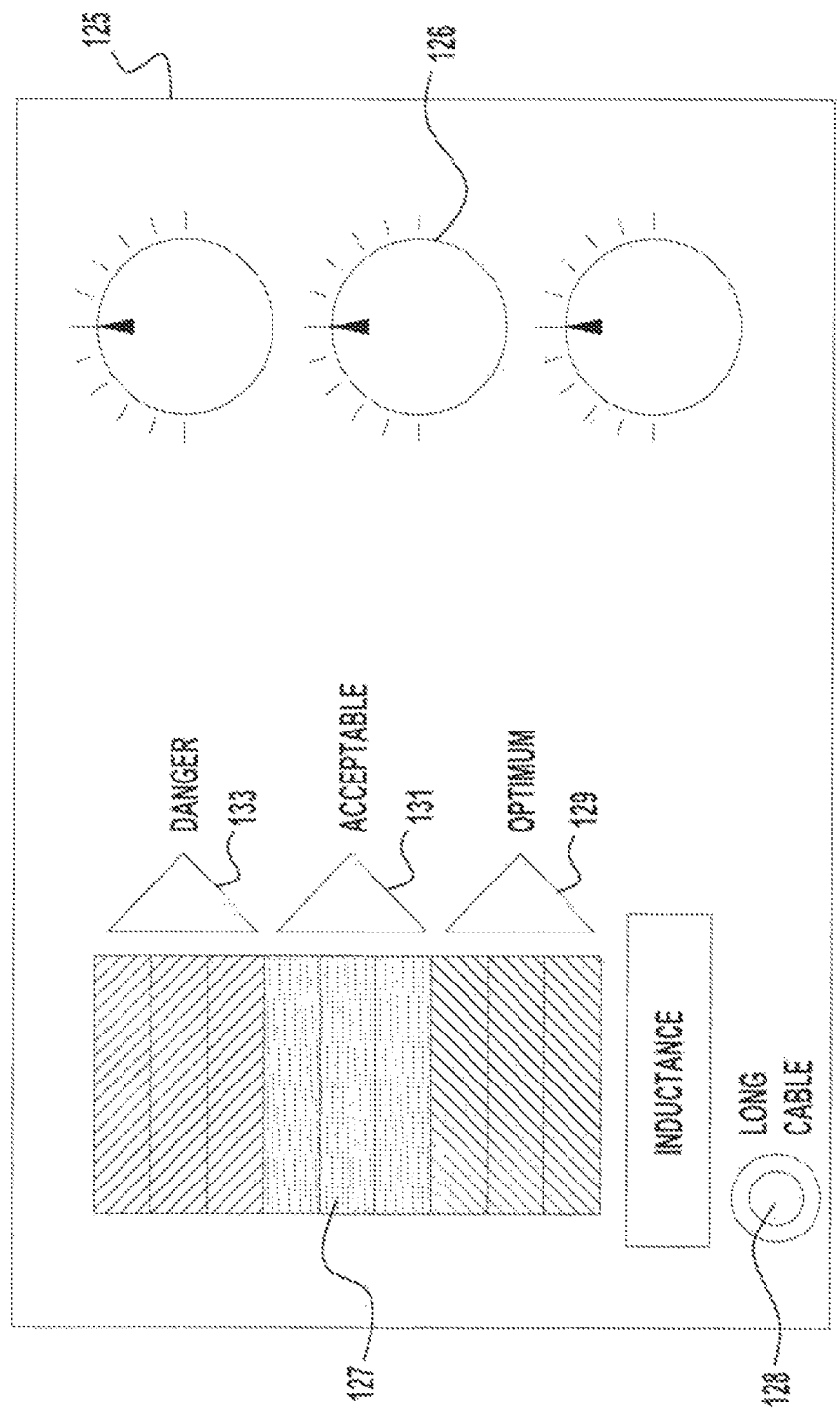
FIG. 3 is a diagrammatical representation of a user interface in accordance with an exemplary embodiment of the present invention.

FIG. 3 depicts an exemplary user interface 125 for the power supply 101. The user interface 125 typically contains a plurality of welding input controls 126, which can include wire feed speed, voltage, current, etc. These controls are typical and embodiments of the present invention are not limited in this regard. The exemplary user interface 125 also has an inductance display 127 which displays information regarding the system inductance which would allow a user to monitor system performance and determine if a change should be made—like a change in the length of the cables 103/105. The inductance display 127 is coupled to the controller 123 such that the voltage comparison data from the controller can be displayed on the display 127. In exemplary embodiments of the present invention, the display 127 has at least one user warning indicator. Thus, when the detected peak voltage reaches or exceeds a user warning level a warning indication is displayed in the display 127 to show the user that the inductance of the welding circuit is causing the power supply to approach or exceed a system threshold.

In the exemplary embodiment shown in FIG. 3, the display 127 has a plurality of indication levels which provide a user with relative data regarding the performance of the power supply 101. As shown in FIG. 3 the display 127 has three indication levels. They are: OPTIMUM 129, ACCEPTABLE 131, and DANGER 133. Further, each of the indication levels are divided into further indication levels. Of course, the depiction in FIG. 3 is intended to be exemplary and embodiments of the present invention are not limited to this indication mechanism.

In FIG. 3, each of the indication levels 129, 131, and 133 have a distinct identifier, which can be color, pattern, etc. For example, the OPTIMUM level can use a green color, the ACCEPTABLE level can use a yellow color, and the DANGER level can use a red color in the display 127. This will allow a user to easily determine the performance of the power supply 101.

During welding, the controller 123 compares the voltage from the circuit 117 to a threshold voltage and based on that comparison will illuminate the appropriate region in the display. Thus, if the output voltage is in a first percentage range of the threshold value a first region will be illuminated, if the detected voltage is in a second percentage range of the threshold voltage a second region will be illuminated and if the output voltage is above the second percentage range a third region will be illuminated. In an exemplary embodiment of the present invention, if the detected voltage is at or below 75% of the threshold voltage the controller 123 will cause the first region 129 on the display 127 to be illuminated. The number of bars illuminated in the region 129 will be a function of the determined percentage difference. That is, if the detected difference is close to 75% then all three bars in the region 129 will be illuminated. Further, if the detected difference is in the range of 75 to 95% of the threshold then at least some the bars in the region 131 will be illuminated. Finally, if the voltage is above 95% of the threshold then at least some of the bars in the region 133 will be illuminated. This will provide the user with a clear indication of how the system inductance is affecting the welding operation.

In other exemplary embodiments it is not necessary to use a percentage comparison, but other means of comparison can be used. For example, rather than a having a single threshold value stored in the controller 123, the controller 123 can simply have/determine a number of threshold voltage values.

The operation would be similar to that described above except that rather than using a percentage of the threshold value to determine the proper indication on the display 127, the controller will compare the detected voltage to the determined/programmed voltage levels and make the appropriate display. For example, the controller will illuminate the region 129 when the voltage is less than 45 volts, illuminate the region 131 when the output is in the range of 45 to 55 volts and illuminate the region 133 when the voltage is above 55 volts. It is envisioned that these voltage ranges are based on the capability of the power source. This is because another power source running the same waveform, but having different capabilities with the associated operational range, may not have performance issues. For example, as compared to the example above, another power source may have voltage levels of up to 53 volts, within the range of 53 to 62 volts, and above 62 volts, for the various thresholds. Other alternatives can be used without departing from the scope or spirit of the present application.

In some exemplary embodiments, the user interface 127 can have an inductance monitoring switch 128. This switch will allow the user to turn on or off the monitoring function. For example, if the cables 103/105 are of a short length, the user may then not be concerned with inductance monitoring and can disable the feature. Similar, if the user is using cables 103/105 which are longer than normal then the user can turn on the monitoring to determine if the welding operation is within normal operating limits.

In other exemplary embodiments the controller 123 can have an emergency shut-off threshold, where if the detected voltage is above a certain maximum acceptable threshold the controller 123 will cause the power components 121 to shut down and stop providing an output.

In other exemplary embodiments, a display device 127 can additionally or alternatively provided on a wire feeder device 107 or on a welding gun holding the contact tip 109 (not shown). Because the user will likely be remotely positioned during welding operations, having a display 127 on either of the welding gun or wire feeder 107 will allow the user to monitor inductance while being remote from the power supply. Alternatively a similar display 127 can be placed on a welding pendant 135 (see FIG. 1). The use of welding pendants 135 are known in the welding industry to allow for the remote operation of welding power supplies and/or wire feeders. Thus, a pendant 135 can have the display 127 to allow the user to monitor inductance while welding remotely from the power supply. The pendant 135 can be coupled to either the power supply via wired or wireless connection.

Therefore, embodiments of the present invention monitor the peak voltage reached during welding to determine if the peak voltages are at or near a capacity level of the power supply 101. This information is then communicated to the user via a display 127, or similar means, to allow the user to adjust the welding system configuration (e.g., shorten the welding cables) to ensure acceptable power supply performance.

Figure 4A:
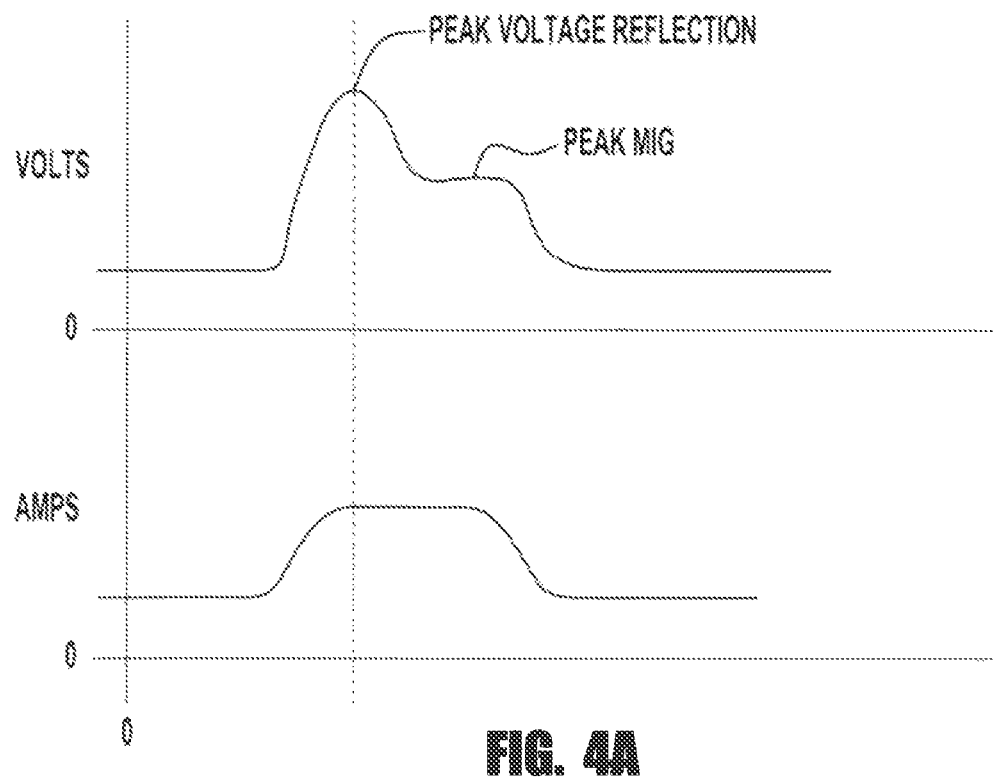
FIGS. 4A and 4B are diagrammatical representations of voltage and current waveforms.
Figure 4B:
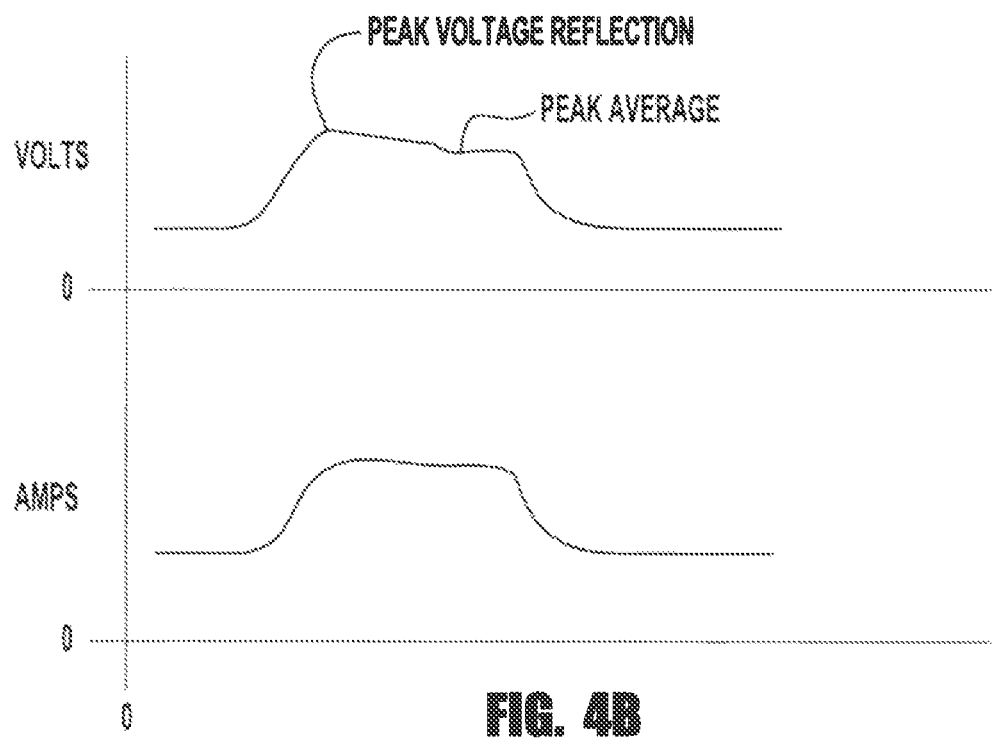

FIGS. 4A and 4B depict the voltage and current of a representative DC welding pulse waveform in a high inductance and low inductance welding circuit, respectively. The waveform In FIG. 4A the system is using long welding cables 103/105. As can be seen, as the current ramps from a background level to a peak level, the peak voltage reflection is considerably higher than the average peak voltage. This voltage spike can be close to the operational limits of the power supply 101 as described above. This is especially true if the average peak voltage is set near the operational limits of the power supply 101. However, in FIG. 4B a similar current pulse is shown having a similar ramp rate to that shown in FIG. 4A. However, because the system inductance is lower (shorter cables) the peak voltage reflection is considerable less and much closer to the average peak voltage. In this case the power supply 101 is operating well within its operational limits. It should be noted that the waveforms shown in FIGS. 4A and 4B are DC welding waveforms, but are only shown for exemplary purposes. As stated previously, embodiments can be used in any welding system which welds with waveforms having a current ramp rate which can cause the inductance issues described herein. For example, the welding waveforms can be AC, variable polarity, pulse, etc. These waveforms are understood by those of ordinary skill in the art, as is their use, implementation output from a power supply.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding or cutting power supply, comprising:
   a first output terminal;
   a second output terminal;
   a power component module coupled to each of said first and second output terminals which outputs an output signal through at least one of said first and second terminals;
   a first lead coupled to said first terminal;
   a second lead coupled to said second terminal;
   a voltage detection circuit which detects a reflected voltage across said first and second output terminals during a welding or cutting operation;
   a comparator circuit which compares said reflected voltage to a threshold voltage; and
   a user display which displays a result of said comparison between said reflected voltage and said threshold voltage for a user of said power supply,
   wherein said reflected voltage is caused by an inductance when an output current of said power supply is changed, and
   wherein said threshold voltage is an output voltage limit of said power supply, wherein said output voltage limit relates to performance of said power supply.

2. The welding or cutting power supply of claim 1, wherein at least one of said comparator circuit compares said reflected voltage to said threshold voltage and said voltage detection circuit detects said output voltage when an expected current ramp rate of said output signal is to be at or above a threshold current ramp rate.

3. The welding or cutting power supply of claim 1, wherein said threshold current ramp rate is 250 A/ms.

4. The welding or cutting power supply of claim 1, wherein said user display uses a first display appearance when said reflected voltage is at a first magnitude and uses a second display appearance when said reflected voltage is at a second magnitude, wherein said first and second display appearances are different.

5. The welding or cutting power supply of claim 4, wherein said first and second appearances are shown in different regions of said user display.

6. The welding or cutting power supply of claim 1, wherein said threshold voltage is a predetermined voltage limit of said power supply.

7. The welding or cutting power supply of claim 1, wherein said threshold voltage is a maximum output voltage of said power supply.

8. The welding or cutting power supply of claim 1, further comprising a controller which prevents said output power module from outputting said output signal when said reflected voltage reaches a predetermined level.

9. The welding or cutting power supply of claim 1, wherein said comparison of said reflected voltage to said threshold voltage is used to determine said inductance, where said inductance is the inductance of a welding or cutting circuit which comprises said output power module, said first and second terminals, said first and second leads and a work piece to be welded or cut.

10. The welding or cutting power supply of claim 1, wherein said user display comprises at least a first, second and third display region, and wherein when said reflected voltage is below a first magnitude an indication is displayed in said first region, when said reflected voltage is at or between said first magnitude and a second magnitude an indication is displayed in said second region, and when said reflected voltage is above said second magnitude an indication is displayed in said third region.

11. The welding or cutting power supply of claim 10, wherein said first, second and third regions have different display appearances.

12. The welding or cutting power supply of claim 10, wherein said first magnitude is 75% of said threshold voltage and said second magnitude is 95% of said threshold voltage.

13. The welding or cutting power supply of claim 1, further comprising a monitoring switch which activates at least one of said user display, said voltage detection circuit and said comparator circuit such that when said monitoring switch is not activated said display will not display said result.

14. The welding or cutting power supply of claim 1, wherein said output signal is one of a DC signal, AC signal and variable polarity signal.

15. A method of welding or cutting, comprising:
   coupling a first lead to a first terminal of a welding or cutting power supply;
   coupling a second lead to a second terminal of said power supply;
   outputting a welding or cutting signal through at least one of said first and second terminals to weld or cut a work piece;
   detecting a reflected voltage across said first output terminal and said second output terminal during said welding or cutting of said work piece;
   comparing said reflected voltage to a threshold voltage; and
   displaying a result of said comparison on a user display for a user during said welding or cutting,
   wherein said threshold voltage is an output voltage limit of said power supply, wherein said output voltage limit relates to performance of said power supply, and
   wherein said reflected voltage is caused by an inductance when an output current of said power supply is changed.

16. The method of claim 15, wherein each of said detecting, comparing and displaying steps are performed when an expected current ramp rate for said output signal is to be at or above a threshold current ramp rate.

17. The method of claim 16, wherein said threshold current ramp rate is 250 A/ms.

18. The method of claim 15, wherein said displaying step comprises displaying an indication in a first region of said user display when said reflected voltage is at a first magnitude and in a second region of said user display when said reflected voltage is at a second magnitude.

19. The method of claim 15, wherein said displaying step comprises displaying an indication with a first appearance when said reflected voltage is at a first magnitude and with a second appearance when said reflected voltage is at a second magnitude, wherein said first and second appearances are different.

20. The method of claim 15, wherein said threshold voltage is predetermined for said power supply.

21. The method of claim 15, wherein said threshold voltage is a maximum output voltage of said power supply.

22. The method of claim 15, further comprising turning off said output signal when said reflected voltage reaches a predetermined level.

23. The method of claim 15, further comprising using said comparison between said reflected voltage to said threshold voltage to determine said inductance, where said inductance is the inductance of a welding or cutting circuit which comprises said power supply, said first and second terminals, said first and second leads and said work piece.

24. The method of claim 15, wherein said user display comprises at least a first, second and third display region, and displaying an indication in said first region when said reflected voltage is below a first magnitude, displaying an indication in said second region when said reflected voltage is at or between said first magnitude and a second magnitude, and displaying an indication in said third region when said reflected voltage is above said second magnitude.

25. The method of claim 15, further comprising displaying an indication with a first appearance when said reflected voltage is below a first magnitude, displaying an indication with a second appearance when said reflected voltage is at or between said first magnitude and a second magnitude, and displaying an indication with a third appearance when said reflected voltage is above said second magnitude, wherein each of said first, second and third appearances are different.

26. The method of claim 25, wherein said first magnitude is 75% of said threshold voltage and said second magnitude is 95% of said threshold voltage.

27. The method of claim 15, wherein at least one of said displaying step, comparing step or detecting step will not occur unless a monitoring switch is activated.

28. The method of claim 15, wherein said welding or cutting signal is one of a DC signal, AC signal and variable polarity signal.

* * * * *